March 4, 1941.  I. AMUNDSEN  2,233,505
HOT LIQUID ACCUMULATOR
Filed Jan. 24, 1938
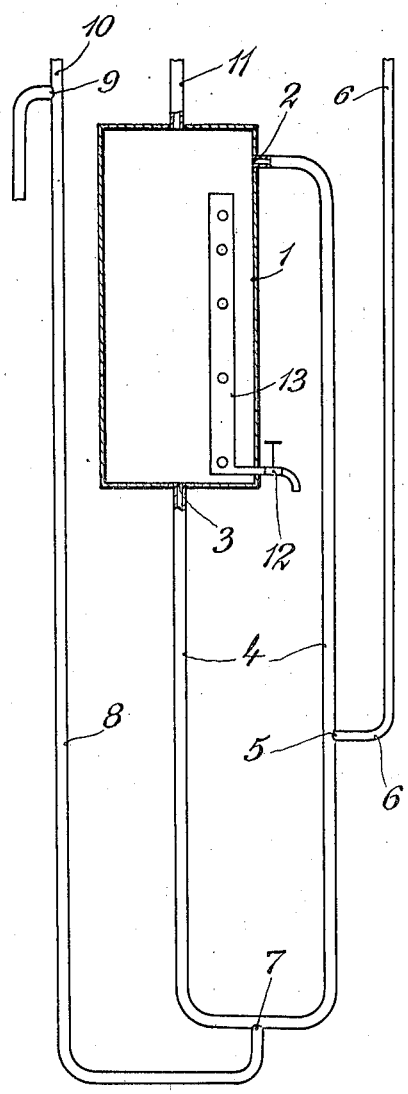
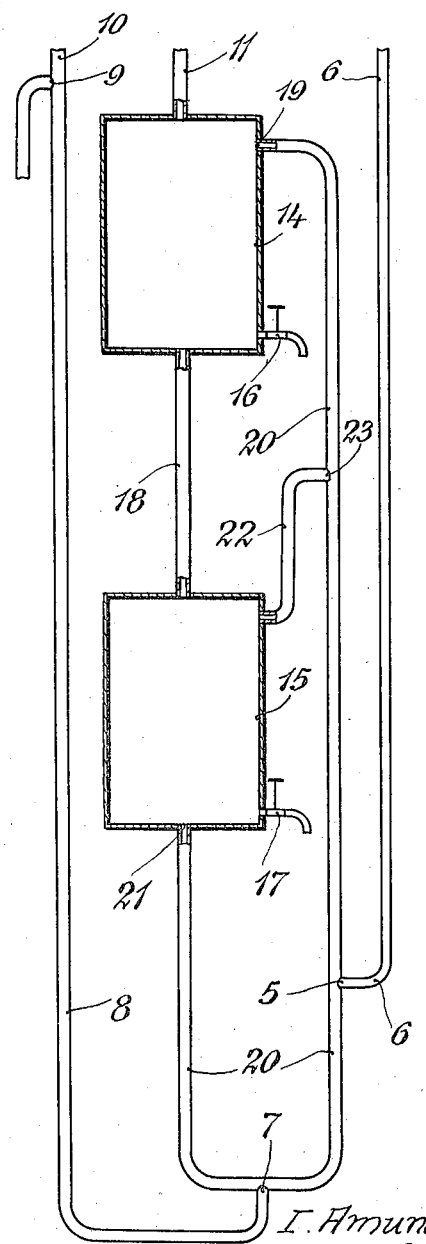
I. Amundsen
INVENTOR
By: Glascock Downing & Seebold Attys.

Patented Mar. 4, 1941

2,233,505

UNITED STATES PATENT OFFICE 2,233,505

HOT LIQUID ACCUMULATOR

Ivar Amundsen, Bygdo, near Oslo, Norway

Application January 24, 1938, Serial No. 186,730
In Norway January 23, 1937

5 Claims. (Cl. 137—111)

(Granted under the provisions of sec. 14, act of
March 2, 1927; 357 O. G. 5)

The present invention relates to apparatus for automatically collecting and storing hot liquids from a supply of liquid of varying temperatures.

It is often desirable to accumulate, from a conduit carrying liquid of varying temperature, the hot part of the liquid in said conduit. This is, for instance, true for the cooling water coming from an absorption refrigerator having intermittent operation, where the temperature of the discharging water varies considerably, say between 70° and 20° C., and where it as a rule is important to be able to accumulate the hot part of the discharging water for using the same in a suitable manner.

Such accumulation of the hot liquid is in accordance with the invention attained in one or more containers, which are in open connection with the conduit carrying liquid of varying temperature, and takes place automatically due to the differences in the specific gravity of the liquid at the temperatures existing in the conduit and in the container or containers.

In a preferred embodiment of the invention the container or containers are in open connection with a liquid seal provided in the conduit. A tube system or the like is arranged in such manner in connection with the container or containers that open communication is obtained both between the container or containers and said tube system and between the containers mutually. Further the tube system is in open communication both with the conduit carrying liquid of varying temperature and with the outlet of the liquid seal.

When one container only is used, the arrangement operates in such a manner that liquid supplied to the tube system and having a higher temperature than the liquid in the container, will rise into said container, whereas liquid of a lower temperature than the liquid in the container is by-passed through the liquid seal to the outlet.

When several containers are used, one above the other, water supplied to the tube system will rise into the topmost container as long as the supplied liquid is hotter than the liquid in that container, whereafter the liquid at a lower temperature enters the next lower container as long as it is hotter than the liquid in this container, and so on downwardly until the supplied liquid is colder than the liquid in the lowermost container, when the supplied liquid is passed by the containers to the outlet.

In the drawing two embodiments of the invention are illustrated for accumulation of hot water, where Figure 1 is a sectional view illustrating an arrangement having one single container for the water and Figure 2 illustrates an arrangement having two containers.

In Figure 1 the numeral 1 indicates a preferably heat insulated container of suitable volume. At 2 and 3 respectively the container is in open communication with a tube 4, which also may be heat insulated. Said tube is at 5 in open communication with the conduit 6 which carries water of varying temperature, and at 7 the tube 4 is in open communication with a tube 8, the latter having an outlet 9 situated at a higher level than the container 1. Both the tube 8 and the container 1 are at their tops in open communication with the atmosphere through tubes 10 and 11 respectively.

This arrangement operates in the following manner:

When water is supplied through the conduit 6 the container 1 is filled and thereafter water runs out at the outlet 9. If the temperature of the water is uniform throughout, the water in the container 1 and in the tube 4 will then be at rest, except from the part of the tube 4 between 5 and 7. If now hotter water from the conduit 6 enters the tube 4 such water will, due to its lower specific gravity, rise in the tube 4 and enter the container 1 at 2; at the same time water flows out of the container at 3 in the bottom thereof, and passes through the tube 4 and the connection 7 to the tube 8 and to the outlet 9. In this manner the hot water from the conduit 6 is accumulated in the container 1 as long as the supplied water has a higher temperature than the water in the container. If, however, the temperature of the supplied water falls down to and below the temperature of the water in the container, the flow of water to the container will stop since the supplied water is now heavier than the water in the container. The supplied water now passes through the tube 4 between the points 5 and 7 to the outlet. The water automatically so adjusts itself in the two vertical branches of the tube 4, that the condition of equilibrium described is maintained as long as the water supplied from the conduit 6 is colder than the water in the container 1, the water in said container thus remaining at rest therein. However, as soon as the supplied water again becomes hotter than the water in the container, the supplied water will rise into the container and become accumulated therein. If the water is not drawn from the container, it accordingly will become hotter and hotter, assuming that the variations in the temperature of the water are regular, and at last only the most hot part of the water from the conduit 6 enters the container, the remainder going to the outlet.

The water may be drawn from the container through the cock 12, and then all the water supplied from the conduit 6 enters the container 1 until the container is again filled. In order that the hottest water at the top of the container shall be drawn, the cock may be in communication with a tube 13 within the container, the open top end of which tube extends into the top portion of the container and the side wall of which is provided with perforations at increasing intervals down towards the cock. Or the perforations may have decreasing diameters towards the cock (not shown). Such an arrangement ensures that the hottest top water in the container is drawn since that water then most easily enters the tube 13. For the same purpose also an other cock (not shown) may be provided at a higher level on the container.

Figure 2 illustrates an embodiment having two containers, 14 and 15, arranged one above the other and each provided with a drain cock 16 and 17 respectively.

The lower part of container 14 is by means of a pipe 18 in open communication with the top of the container 15 and at 19 the container 14 communicates with a tube 20, which corresponds to the tube 4 in Figure 1. The bottom part of container 15 communicates with the tube 20, and the top part thereof is by means of a tube 22 in communication with the tube 20 at 23, situated at a level between the bottom of the container 14 and the top of the container 15. At 5 the tube 20 communicates with the supply conduit 6 and at 7 with the tube 8, the outlet 9 of which is situated at a higher level than the container 14. The tube 8 and the container 14 are at their tops in open communication with the atmosphere through the tubes 10 and 11 respectively.

When the containers 15 and 14 are filled with water from the supply conduit 6, further supply of water from the conduit 6 will cause overflow of water at the outlet 9. If the water supplied is hotter than the water in the container 14, the supplied water rises in the tube 20 and at 19 enters the container 14, a quantity of water corresponding to that entering at 19 flowing from the container 14 at the bottom thereof through the pipe 18 into the container 15. This in its turn causes a corresponding displacement of water from the bottom part of the container 15 into the tube 20, so that water flows through 7, 8 and 9 to the outlet. When the temperature of the supplied water falls below the temperature in the container 14 the water is passed by this container in the same manner as described in connection with the construction shown in Figure 1, and this condition is automatically maintained due to the equilibrium between the water in the top part of the tube 20 at one side and the water in the container 14 and in that part of the tube 18 which is at a higher level than 23 at the other side. However, if the supplied water is hotter than the water in the container 15, the supplied water passes through the tube 22 into the container 15. If the temperature of the supplied water falls below the temperature of the water in the container 15, the supplied water will, as above described, pass by the containers, through the tube 20 between the points 5 and 7 to the outlet.

When water is drawn from the container 14 through the cock 16 a corresponding quantity of water flows to the container from or through the container 15. When drawing by means of the cock 17 the container 15 is refilled from the container 14 and from the supply conduit 6.

By the use of several water containers the hottest water is accumulated in the topmost container, the temperature of the water in the containers below being in succession lower and lower.

What I claim is:

1. An arrangement for automatic trapping and accumulating the hotter parts of a stream of liquid of varying temperature passing through a conduit which is in open communication with an outlet to waste comprising in combination, a container situated at a lower level than said outlet to waste, a tube openly connecting said conduit with the upper part of said container and extending upwardly to the container, a tube openly connecting the lower part of the container with said outlet to waste, and means for withdrawing at will hot liquid trapped and accumulated in said container.

2. An arrangement for automatic trapping and accumulating the hotter parts of a stream of liquid of varying temperature passing through a conduit which is in open communication with an outlet to waste comprising in combination, a container situated at a lower level than said outlet to waste, a tube openly connecting said conduit with the upper part of said container and extending upwardly to the container from the conduit, and a tube openly connecting the lower part of said container with said outlet to waste.

3. An arrangement for automatic accumulation of the hotter part of cooling water of varying temperature flowing in a conduit leading to waste from the heat exchanging means of a generation-absorption vessel of an intermittent absorption refrigeration plant during the cooling periods of said vessel comprising in combination, a collecting container, an open connecting tube rising from said conduit to the upper part of the collecting container, an open tube communicating the lower part of said container to an outlet to waste, said outlet being situated at a higher level than said container, and an open tube connecting said outlet to waste with said conduit at a point below said container.

4. An arrangement for automatic trapping and accumulating the hotter parts of a stream of liquid of varying temperature passing through a conduit which is in open communication with an outlet to waste comprising in combination, a container situated at a lower level than said outlet to waste, a tube openly connecting said conduit with the upper part of said container and extending upwardly to the container, a tube openly connecting the lower part of the container with said outlet to waste, and means for withdrawing liquid from said container from points above the bottom thereof.

5. Apparatus for automatically collecting hotter parts of a stream of liquid at a varying temperature comprising, a first container, a second container arranged below the first container, a pipe connecting the lower part of the first container with the top of the second container, a conduit for the stream of liquid, a tube connecting the bottom of the second container with the top of the first container and rising from a connection with said conduit, a second tube branched from the rising portion of the first tube and connected to the top of the second container, and an outlet tube extending from the first tube from a point below said containers and terminating above the top of the first container.

IVAR AMUNDSEN.